(12) United States Patent
Lisart et al.

(10) Patent No.: US 9,052,345 B2
(45) Date of Patent: Jun. 9, 2015

(54) SYSTEM FOR DETECTING A LASER ATTACK ON AN INTEGRATED CIRCUIT CHIP

(71) Applicant: STMicroelectronics (Rousset) SAS, Rousset (FR)

(72) Inventors: Mathieu Lisart, Aix En Provence (FR); Thierry Soude, Marseilles (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 211 days.

(21) Appl. No.: 13/654,991

(22) Filed: Oct. 18, 2012

(65) Prior Publication Data

US 2014/0111230 A1    Apr. 24, 2014

(30) Foreign Application Priority Data

Oct. 19, 2011 (FR) ...................... 11 59445

(51) Int. Cl.
*G01R 27/08* (2006.01)
*H01L 23/00* (2006.01)

(52) U.S. Cl.
CPC .............. *G01R 27/08* (2013.01); *H01L 23/576* (2013.01)

(58) Field of Classification Search
CPC ..................................................... G01R 27/08
See application file for complete search history.

(56) References Cited

U.S. PATENT DOCUMENTS

| | | | | |
|---|---|---|---|---|
| 7,821,841 | B2 * | 10/2010 | Kim .......................... | 365/185.32 |
| 7,847,581 | B2 * | 12/2010 | Lisart et al. ....................... | 326/8 |
| 2002/0130248 | A1 * | 9/2002 | Bretschneider et al. .. | 250/214 R |
| 2006/0081912 | A1 * | 4/2006 | Wagner et al. ................. | 257/316 |
| 2006/0180939 | A1 | 8/2006 | Matsumo | |
| 2009/0113546 | A1 * | 4/2009 | Kim et al. ...................... | 714/805 |
| 2009/0251168 | A1 * | 10/2009 | Lisart et al. .................... | 438/527 |
| 2011/0002184 | A1 * | 1/2011 | Kim .............................. | 365/207 |
| 2011/0080190 | A1 * | 4/2011 | Fornara et al. .................... | 326/8 |
| 2012/0320480 | A1 * | 12/2012 | Lisart et al. .................... | 438/200 |
| 2013/0100559 | A1 * | 4/2013 | Kuenemund et al. ........... | 257/48 |
| 2013/0200371 | A1 * | 8/2013 | Marinet et al. .................. | 257/48 |

FOREIGN PATENT DOCUMENTS

WO    WO 2004047172 A1    6/2004

OTHER PUBLICATIONS

French Search Report and Written Opinion dated Mar. 30, 2011 from corresponding French Application No. 11/59446.

* cited by examiner

*Primary Examiner* — Jermele M Hollington
(74) *Attorney, Agent, or Firm* — Seed IP Law Group PLLC

(57) ABSTRACT

A system for detecting a laser attack on an integrated circuit chip formed in a semiconductor substrate, including a detection device capable of detecting voltage variations of the substrate. The system includes P-type first wells and N-type second wells extending in a P-type upper portion of the substrate; an N-type buried layer extending under at least a portion of the first and second wells; biasing contacts for the second wells and the buried layer; ground contacts for the first wells; and substrate contacts for detecting a substrate voltage, the detection contacts surrounding the first and second wells. The detection device comprises a resistor having a first terminal connected to said ground contacts of the first wells and a second terminal connected to said substrate contacts; and a comparator connected in with the resistor configured to detect a potential difference across the resistor.

18 Claims, 5 Drawing Sheets

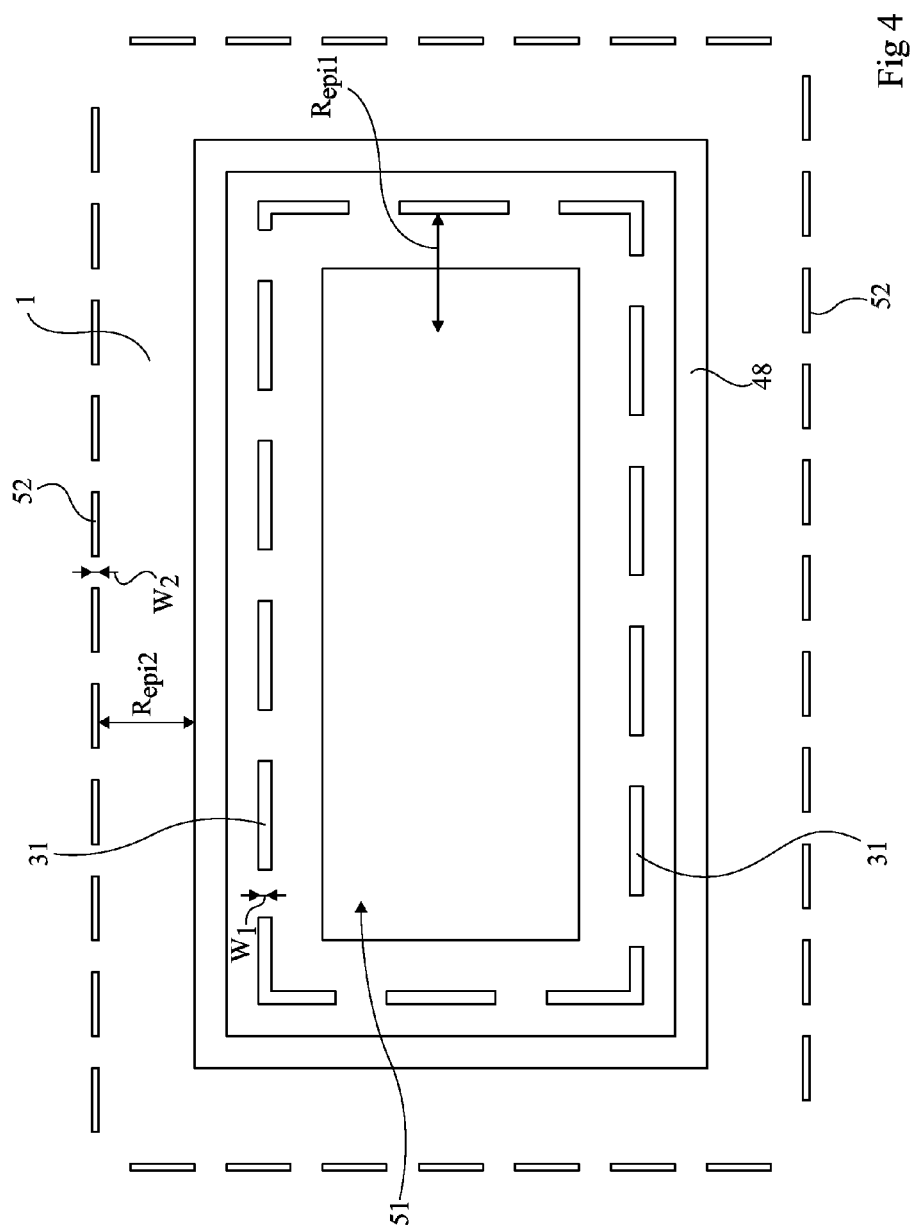

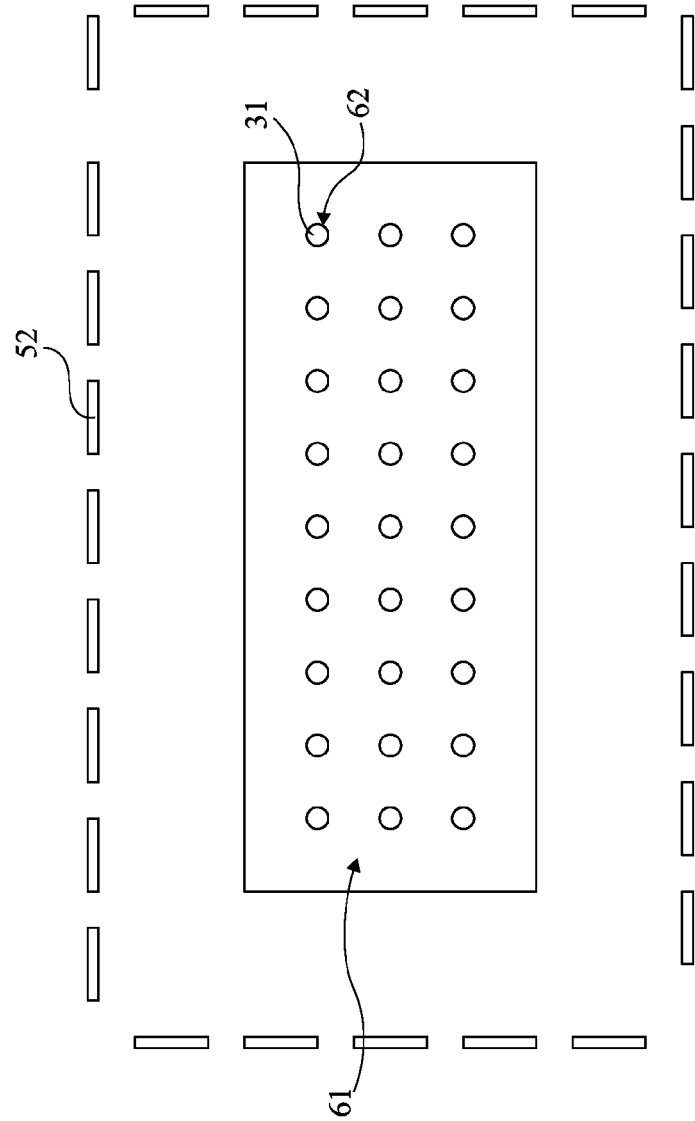

SYSTEM FOR DETECTING A LASER ATTACK ON AN INTEGRATED CIRCUIT CHIP

CROSS REFERENCE TO RELATED APPLICATIONS

This application claims the priority benefit of French patent application number 11/59445, filed on Oct. 19, 2011, which is hereby incorporated by reference to the maximum extent allowable by law.

BACKGROUND

1. Technical Field

The present disclosure relates to the protection of an integrated circuit chip against laser attacks.

2. Discussion of the Related Art

Some integrated circuit chips may be the target of external attacks aiming at disturbing the normal operation of the integrated circuit or at obtaining protected confidential data. To intentionally cause disturbances in the circuits of a chip, an attack mode comprises bombarding chip areas with a laser beam while the chip is operating. Due to the presence of interconnection metal tracks on the front surface side of the chip, laser attacks are often carried out on the back side.

To avoid fraud, chips comprising attack detection devices have been provided. The attack detection device is coupled to a chip protection circuit. When an attack is detected, the protection circuit implements measures of protection, modification, or destruction of the critical data. For example, it may be provided, when an attack is detected, to interrupt the power supply of the chip or to cause its resetting, in order to reduce the time during which the attacker can study the chip response to a disturbance.

European patent EP2109139 describes an embodiment of an integrated circuit chip associated with a device for detecting a laser attack.

FIG. 1 is a partial simplified cross-section view of such an integrated circuit chip. The integrated circuit chip comprises P-type doped wells 2 and N-type doped wells 4 extending in the upper P-type doped portion of a substrate 1 of a semiconductor material, for example, a silicon epitaxial layer. Only a well 2 and a well 4 are shown. Wells 2 and 4 are laterally separated by an insulating region 5 formed in substrate 1. Each of wells 2, 4 may contain several components. As an example, a P-channel transistor T1 has been shown in well 4 and an N-type transistor T2, close to transistor T1, has been shown in well 2. Each transistor comprises a gate 7 of a conductive material, insulated from substrate 1 by a gate insulator 6, and doped source and drain regions 9 extending in substrate 1 on either side of gate 7. Source and drain regions 9 of P-channel transistor T1 are heavily P-type doped, and source and drain 9 of N-channel transistor T2 are heavily N-type doped.

A heavily-doped P-type contact region 12, extending at the surface of well 2, is intended to be directly connected to ground GND. A heavily-doped N-type contact region 24, extending at the surface of well 4, is intended to be connected to a source of voltage $V_{dd}$.

N-channel transistor T2 of well 2 is inverter-assembled with P-channel transistor T1 of well 4, that is, the gate of the N-channel transistor is connected to the gate of the P-channel transistor, forming input terminal IN of an inverter, and the drain of the N-channel transistor is connected to the drain of the P-channel transistor, forming output terminal OUT of the inverter. In operation, the source of the P-channel transistor is at high power supply voltage $V_{dd}$. The source of the N-channel transistor is at ground GND.

The chip comprises an N-type buried layer 16 extending in substrate 1 under wells 2, 4. Buried layer 16 is in contact with N-type well 4. An N-type region 18 extends in substrate 1 from the upper surface of the substrate all the way to buried layer 16. Region 18, with N-type well 4, totally surrounds P-type well 2. A heavily N-type doped contact region 19 extends at the surface of region 18. Contacts 24 and 19 are intended to bias N-type wells 4 and buried layer 16 to voltage $V_{dd}$. A heavily-doped P-type contact region 21, extending at the surface of substrate 1, is intended to be directly connected to ground GND. Contact 21 for example has the shape of a ring surrounding wells 2 and 4. Voltage $V_{dd}$ is provided by a power supply source 26 associated with a detection circuit 28.

When a laser beam reaches the rear surface of the chip, buried layer 16 tends to capture electrons originating from electron/hole pairs photogenerated in the substrate. These electrons are attracted by the positive voltage applied on contacts 19 and 24, and cause parasitic signals which are detected by detection circuit 28.

An embodiment of power supply source 26 and of detection circuit 28 is described in detail in above-mentioned European patent EP2109139.

A disadvantage of the system for detecting a laser attack described in relation with FIG. 1 is due to the fact that noise induced by the normal operation of the chip components is present on contact 24 for biasing $V_{dd}$ of well 4. This noise may be confounded with the parasitic signals resulting from a laser attack. Measures of protection, modification, or destruction of the confidential data of the chip may then be erroneously implemented, while a laser attacked has not occurred.

A system for a detecting a laser attack on an integrated circuit chip is thus needed, the detection system being unlikely to be disturbed by the noise induced by the normal operation of the chip components.

SUMMARY OF THE INVENTION

An embodiment provides a system for detecting a laser attack on an integrated circuit chip, the detection system being unlikely to be disturbed by the noise induced by the normal operation of the chip components.

An embodiment provides a system for detecting a laser attack on an integrated circuit chip formed in a semiconductor substrate, comprising a detection device capable of detecting voltage variations of the substrate.

According to an embodiment, the upper portion of the substrate is of type P and the chip comprises: first P-type wells and second N-type wells extending in the upper portion of the substrate; an N-type buried layer extending under a portion at least of the first and second wells; first contacts for biasing the second wells and the buried layer; second contacts to ground of the first wells; and third contacts for detecting the substrate voltage, surrounding the first and second wells under which the buried layer extends; and the detection device comprises: a resistor having a terminal connected to the second ground contacts of the first wells and its other terminal connected to the third contacts for detecting the substrate voltage; and a comparator connected in parallel with the resistor, capable of detecting a potential difference across the resistor.

According to an embodiment, the buried layer is in contact with the first wells and the second wells under which it extends.

According to an embodiment, each first well under which the buried layer extends is surrounded with N-type areas extending from the upper surface of the substrate all the way to the buried layer.

According to an embodiment, the N-type areas are some of the second wells under which the buried layer, or first N-type regions extending from the upper surface of the substrate all the way to the buried layer, extend.

According to an embodiment, the third contacts for detecting the substrate voltage discontinuously surround the first wells and the second wells under which the buried layer extends.

According to an embodiment, the upper portion of the substrate is doped with a doping level lower than $5.10^{16}$ atoms/cm$^3$.

According to an embodiment, the chip further comprises fourth contacts to ground of the substrate.

According to an embodiment, the chip further comprises second N-type regions extending from the upper surface of the substrate between the third contacts for detecting the substrate voltage and the fourth contacts to ground of the substrate, the second regions surrounding the third contacts for detecting the substrate voltage.

According to an embodiment, the width of the third contacts for detecting the voltage of the substrate is greater than that of the fourth contacts to ground of the substrate.

The foregoing and other features and advantages will be discussed in detail in the following non-limiting description of specific embodiments in connection with the accompanying drawings.

BRIEF DESCRIPTION OF THE DRAWINGS

FIG. 4 is a top view corresponding to FIG. 3; and

FIG. 5 is a top view of another variation of the chip of FIG. 2.

As usual in the representation of integrated circuits, the various drawings are not to scale.

DETAILED DESCRIPTION

Figure 2:
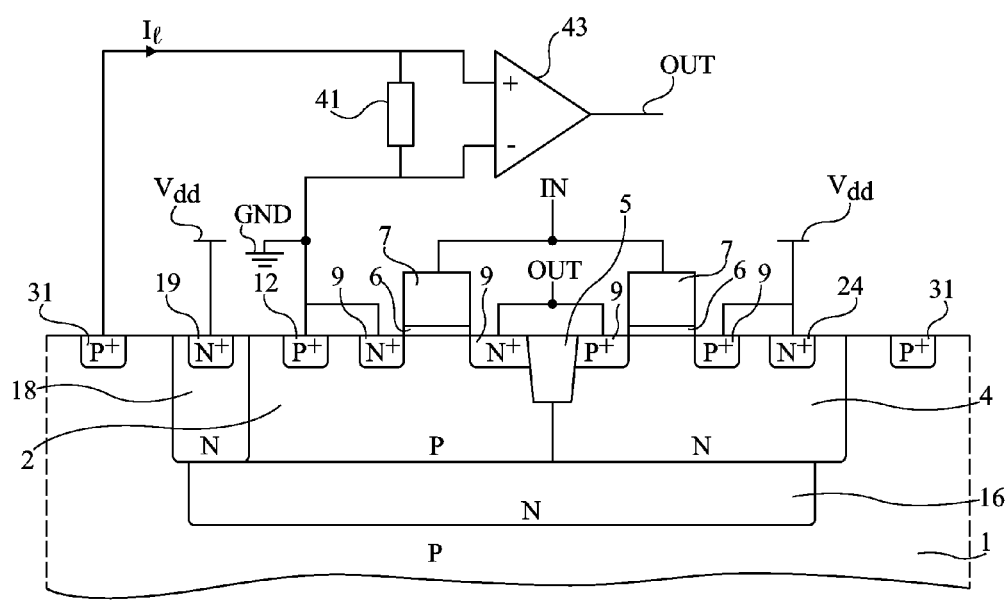
FIG. 2 is a cross-section view schematically and partially showing an integrated circuit chip associated with a device for detecting a laser attack.

FIG. 2 is a cross-section view schematically and partially showing an integrated circuit chip associated with a device for detecting a laser attack.

Figure 1:
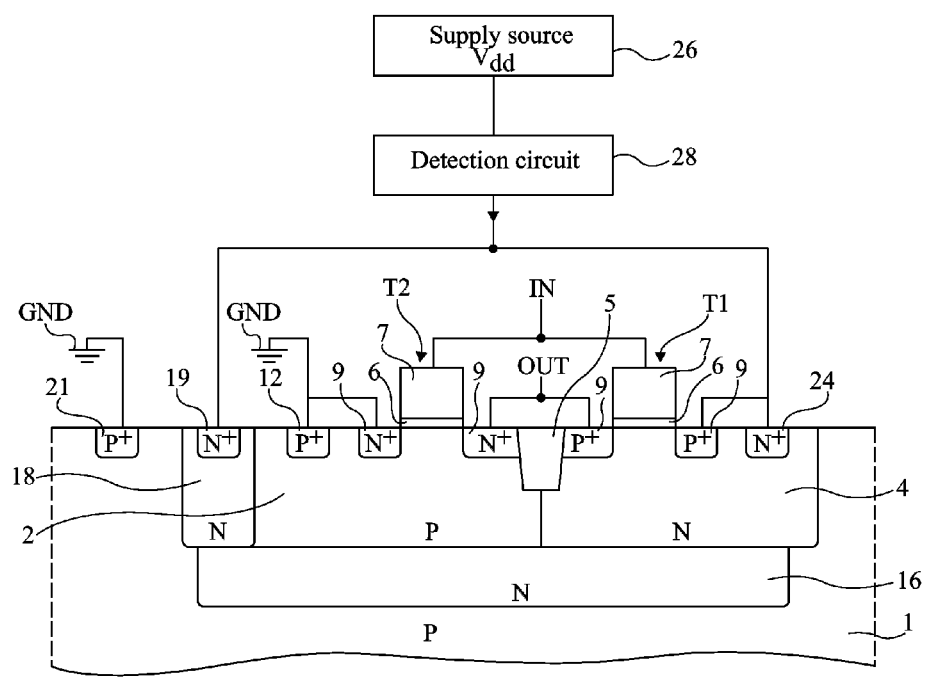
FIG. 1, previously described, is a cross-section view schematically and partially showing an integrated circuit chip associated with a device for detecting a laser attack such as described in European patent application EP2109139.

The elements of FIG. 2 common with those of FIG. 1 are designated with the same reference numerals and will not be described again hereafter.

Heavily-doped P-type regions 31 correspond to regions 21 of FIG. 1 and surround, for example, discontinuously, wells 2 and 4 under which buried layer 16 extends. Conversely to regions 21 of the chip illustrated in FIG. 1, regions 31 are not directly grounded. Regions 31 form contacts for detecting the voltage of substrate 1.

To detect a laser attack in an integrated circuit chip of the type illustrated in FIG. 2, the present inventors provide using a detection device capable of detecting variations of the substrate voltage.

In the example illustrated in FIG. 2, the device for detecting a laser attack comprises a resistor 41, of value $R_{ext}$, having a terminal connected to contacts 12 to ground GND of wells 2, and having its other terminal connected to contacts 31 for detecting the voltage of substrate 1. A comparator 43 has its positive and negative terminals connected across resistor 41.

When a laser beam reaches the rear surface of the chip, electron/hole pairs are photogenerated in P-type substrate 1. The electrons cross N-type buried layer 16 and are attracted by voltage $V_{dd}$ applied on contacts 19 and 24. The holes are attracted by contacts 31 for detecting the voltage of substrate 1 connected, via resistor 41, to ground contacts 12 of wells 2. A current $I_1$ then flows from contacts 31 to contacts 12 through resistor 41, and a potential difference appears across resistor 41. As soon as this potential difference exceeds a given threshold, output OUT of the comparator delivers a laser attack detection signal. Output OUT for example switches from a low level to a high level. Various measures of protection, modification, or destruction of the confidential data of the chip may then be implemented.

Comparator 43 should has a sufficiently fast response to detect a current corresponding to an attack with a pulse laser having pulses shorter than 10 ns. A comparator 43 having a bandwidth of at least 100 MHz will for example be selected.

Since substrate 1 is insulated from wells 2 and 4 under which buried layer 16 extends, contacts 31 for detecting the substrate voltage are free of the noise due to the normal operation of the chip components in wells 2 and 4. Further, the noise on ground contacts GND is generally lower than on contacts connected to voltage $V_{dd}$. Indeed, in the general design of an integrated circuit, ground contacts GND are well distributed across the entire circuit and are interconnected by the largest possible connection rails while, generally, the contacts to voltage $V_{dd}$ are connected by smaller rails to a regulator delivering voltage $V_{dd}$, this regulator being subjected to the circuit switching noise. An additional advantage of such a detection system lies in the use of a particularly simple detection device.

Figure 3:
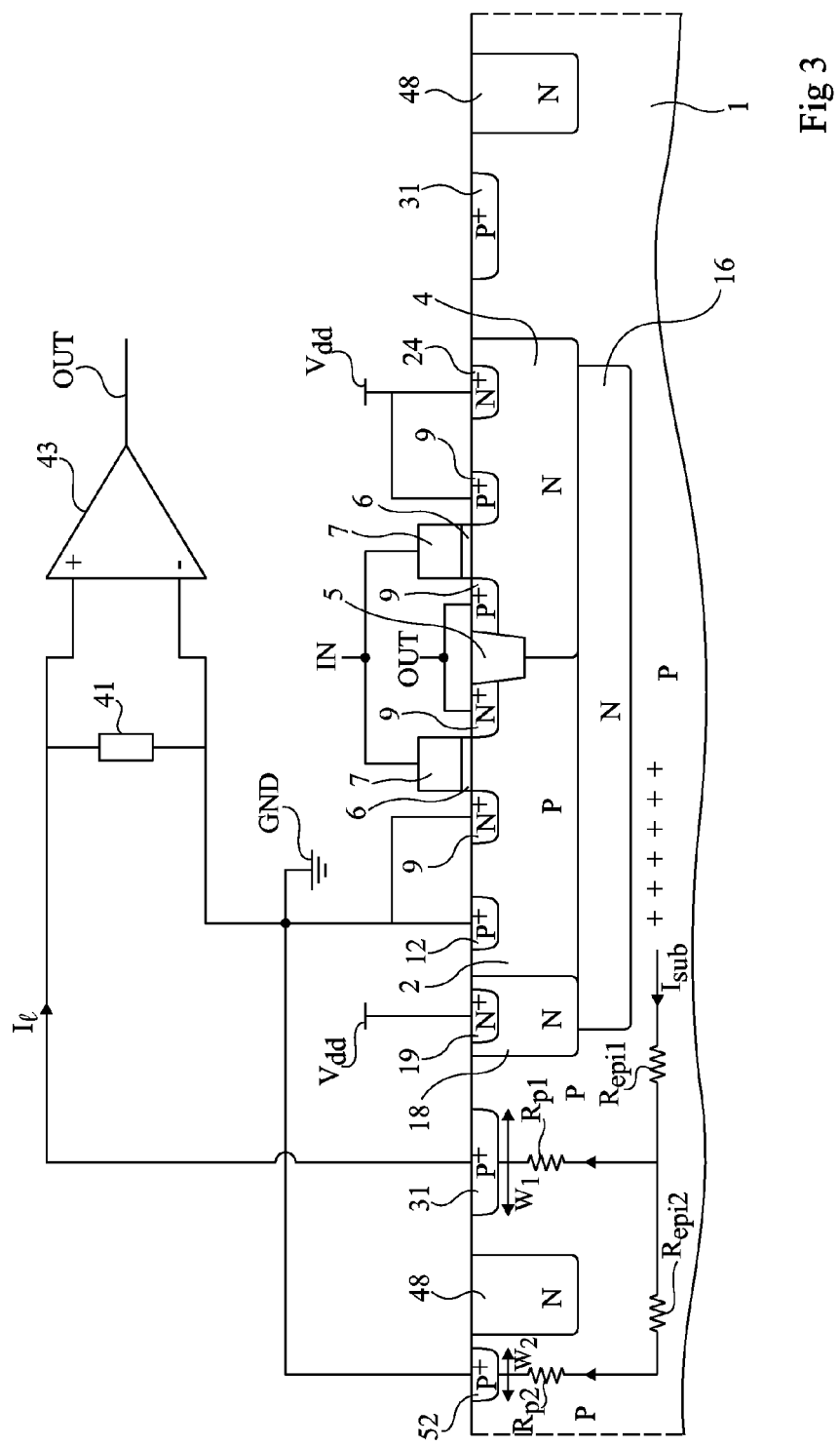
FIG. 3 is a cross-section view of a variation of the chip of FIG. 2.

FIG. 3 is a cross-section view of a variation of the chip of FIG. 2 and FIG. 4 is a corresponding top view. The elements common with FIG. 2 are designated with the same reference numerals.

An N-type region 48 extends from the upper surface of substrate 1 and surrounds contact 31 for detecting the voltage of the substrate which surrounds wells 2 and 4 under which buried layer 16 extends. A heavily-doped P-type contact region 52, extending at the surface of substrate 1, is intended to be connected to ground network GND of the circuit. N-type region 48 extends between substrate voltage detection contact 31 and contact 52. Contact 52 for example has the shape of a ring discontinuously surrounding region 48, as shown in FIG. 4. The terminal of resistor 41 connected to ground contact 12 of well 2 is also connected to ground contact 52 of substrate 1.

In a laser attack, the holes originating from the electron/hole pairs photogenerated in the substrate, under buried layer(s) 16, are likely to be attracted mainly by substrate voltage detection contacts 31 or by ground contacts 52 of the substrate.

Call $I_{sub}$ the hole current generated in the substrate from the electron/hole pairs. As schematically shown in FIG. 3, access resistors $R_{epi1}$ and $R_{epi2}$ respectively correspond to portions of substrate 1 located under buried layer 16 and under region 48. Access resistors $R_{P1}$ and $R_{P2}$ respectively correspond to portions of substrate 1 located under contact 31 and under contact 52.

To optimize the detection of a laser attack, hole current $I_{sub}$ is desired to be mainly directed towards contacts 31, and not towards contacts 52. To achieve this, the present inventors provide a sum of resistances $R_{epi2}$ and $R_{P2}$ of access to contacts 52 much greater than the sum of resistances $R_{epi1}$ and $R_{P1}$ of access to contacts 31 and of resistance $R_{ext}$ of the detection device. The upper portion of substrate 1, where wells 2, 4 and buried layer 16 extend, is preferably lightly doped, for example, between $10^{15}$ and $10^{16}$ atoms/cm$^3$, so that resistance $R_{epi2}$ is high. Further, a width $W_1$ of contacts 31 greater than width $W_2$ of contacts 52 may be provided, so that resistance $R_{P1}$ of access to contact 31 is smaller than resistance $R_{P2}$ of access to contact 52. A good ground network is further provided so that the voltage on the terminal of resistor 41 connected to ground contacts 12 and 52 is as low as possible.

As a practical example, for a resistor 41 having a value $R_{ext}$ on the order of the value of access resistor $R_{epi2}$, approximately half of current $I_{sub}$ is collected by contacts 31. For a value of $I_{sub}$ on the order of 10 mA and a value $R_{ext}$ on the order of 100 ohms, a potential difference on the order of 500 mV will then be obtained across resistor 41, which difference will be detected by comparator 43. It is however sufficient to have a portion of current $I_{sub}$ reaching substrate voltage detection contacts 31 for the detection device to deliver a laser attack detection signal.

In FIG. 4, region 51 corresponds to a plurality of wells 2 and 4, such as those shown in FIG. 2, under which N-type buried layer 16 extends. Region 51 comprises contacts 12 to ground GND of P-type wells 2 interconnected by ground rails. Contacts 31 for detecting the voltage of substrate 1 are arranged to obtain the smallest possible access resistance $R_{epi1}$. Ground contacts 52 of substrate 1 are arranged to obtain a high access resistance $R_{epi2}$. Further, due to the distribution of contacts 31 around region 51, laser attacks can be detected across a large area of the substrate.

FIG. 5 is a top view of another variation of the chip of FIG. 2. Region 61 corresponds to a substrate region 1 comprising a plurality of wells 2 and 4, such as those shown in FIG. 2, under which N-type buried layer 16 extends. Regions 62 of the upper substrate portion under which buried layer 16 does not extend are located between some of the wells. Substrate voltage detection contact regions 31 extend in regions 62. In the example illustrated in FIG. 5, regions 62 are evenly distributed in region 61. A large number of substrate voltage detection contacts 31, connected together and to the positive terminal of comparator 43, are thus obtained. Such a distribution of substrate voltage detection contacts 31 enables to reduce access resistance $R_{epi1}$ and to obtain a good dynamic performance of the detection device.

Specific embodiments have been described. Various alterations, modifications, and improvements will readily occur to those skilled in the art. In particular, although a detection device comprising a resistor connected in parallel with a comparator has been described, those skilled in the art may of course use any other detection device capable of detecting substrate voltage variations.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A system for detecting a laser attack on an integrated circuit chip, comprising:
   a semiconductor substrate having an upper portion of P-type;
   P-type first wells and N-type second wells extending in the upper portion of the substrate;
   an N-type buried layer extending under at least a portion of the first and second wells;
   biasing contacts for the second wells and buried layer;
   ground contacts for the first wells;
   substrate contacts for detecting a substrate voltage, the substrate contacts surrounding the first and second wells; and
   a detection device configured to detect voltage variations of the substrate, wherein the detection device comprises:
      a resistor having a first terminal connected to said ground contacts of the first wells and a second terminal connected to said substrate contacts; and
      a comparator connected in parallel with the resistor and configured to detect a potential difference across the resistor.

2. The system of claim 1, wherein the buried layer is in contact with the first wells and the second wells under which it extends.

3. The system of claim 1, wherein each first well under which the buried layer extends is surrounded by N-type areas extending from an upper surface of the substrate all the way to the buried layer.

4. The system of claim 3, wherein the N-type areas include some of the second wells under which the buried layer extends, and N-type regions extending from the upper surface of the substrate all the way to the buried layer.

5. The system of claim 1, wherein the substrate contacts discontinuously surround the first wells and the second wells under which the buried layer extends.

6. The system of claim 1, wherein the upper portion of the substrate is doped with a doping level lower than $5 \cdot 10^{16}$ atoms/cm$^3$.

7. The system of claim 1, further comprising substrate ground contacts to ground of the substrate.

8. The system of claim 7, further comprising N-type regions extending from an upper surface of the substrate between the substrate contacts and the substrate ground contacts, the N-type regions surrounding the substrate contacts.

9. The system of claim 7, wherein the substrate contacts have a width that is greater than a width of the substrate ground contacts.

10. A system for detecting a laser attack on an integrated circuit chip, comprising:
   a semiconductor substrate having an upper portion;
   a first well of a first conductivity type extending in the upper portion of the substrate;
   a second well of a second conductivity type extending in the upper portion of the substrate;
   a buried layer of the second conductivity type extending under at least portions of the first and second wells;
   a first biasing contact in contact with the second well;
   a second biasing contact in contact with the buried layer;
   a well ground contact in contact with the first well and configured to ground the first well;
   a first substrate contact in contact with the upper portion of the substrate and configured to detect a substrate voltage of the substrate;
   a detection device electrically coupled to the first substrate contact and to the ground contact and configured to detect voltage variations of the substrate, the detection device including:

a resistor having a first terminal electrically coupled to the ground contact and a second terminal electrically coupled to the first substrate contact; and a comparator having first and second inputs electrically coupled to the first and second terminals of the resistor and configured to detect a potential difference across the resistor.

11. The system of claim 10, comprising a second substrate contact in contact with the upper portion of the substrate, the first and second substrate contacts being positioned outside of the first and second wells and at opposite sides of the first and second wells.

12. The system of claim 10, further comprising a third well of the second conductivity type extending from an upper surface of the substrate and completely laterally surrounding the first and second wells, the first and second biasing contacts, the well ground contact, and the first substrate contact.

13. The system of claim 12, further comprising a substrate ground contact electrically coupled to the well ground contact and configured to ground the substrate, the substrate ground contact being positioned outside of the third well.

14. The system of claim 13, wherein the substrate contact has a width that is greater than a width of the substrate ground contact.

15. The system of claim 10, wherein the upper portion of the substrate is doped with a doping level lower than $5 \cdot 10^{16}$ atoms/cm$^3$.

16. A method for detecting a laser attack on an integrated circuit chip, the method comprising:

detecting voltage variations of a semiconductor substrate of the integrated circuit chip, the substrate having an upper portion and the integrated circuit including:

a first well of a first conductivity type extending in the upper portion of the substrate;

a second well of a second conductivity type extending in the upper portion of the substrate;

a buried layer of the second conductivity type extending under at least portions of the first and second wells;

a first biasing contact in contact with the second well;

a second biasing contact in contact with the buried layer;

a ground contact in contact with the first well;

a substrate contact in contact with the upper portion of the substrate; and a detection device electrically coupled to the substrate contact and to the ground contact, wherein the detecting includes:

grounding the first well;

detecting a substrate voltage of the substrate at the substrate contact; and detecting a potential difference across a resistor having a first terminal electrically coupled to the ground contact and a second terminal electrically coupled to the substrate contact, wherein detecting the potential difference includes using a comparator having first and second inputs electrically coupled to the first and second terminals of the resistor.

17. The method of claim 16, further comprising grounding the substrate with a substrate ground contact electrically coupled to the well ground contact, the substrate ground contact being positioned outside of a third well of the second conductivity type extending from an upper surface of the substrate and completely laterally surrounding the first and second wells, the first and second biasing contacts, the well ground contact, and the first substrate contact.

18. The method of claim 16, wherein the upper portion of the substrate is doped with a doping level lower than $5 \cdot 10^{16}$ atoms/cm$^3$.

* * * * *